A. J. HORAN & J. H. GRAY.
METAL WHEEL BLOCK.
APPLICATION FILED AUG. 14, 1916.
1,228,438. Patented June 5, 1917.
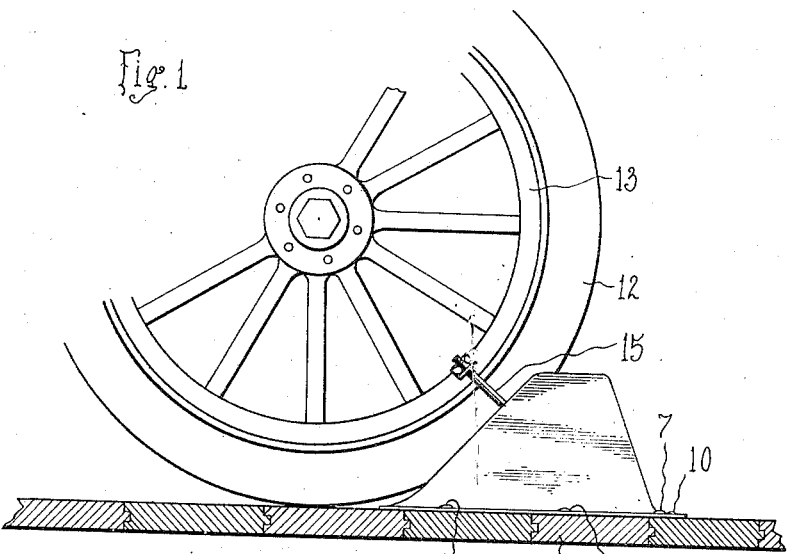
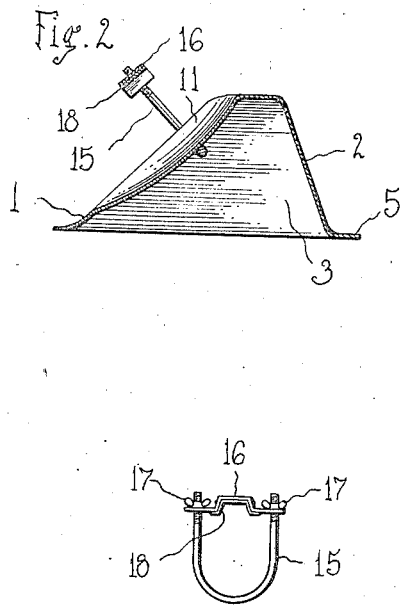
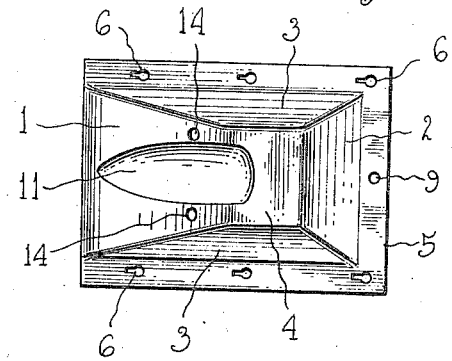
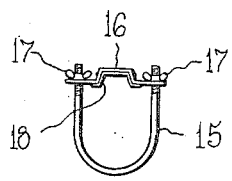
Witnesses
Arthur F. Draper
Karl H. Butler
Inventors
Arthur J. Horan
James H. Gray
By
Attorneys

UNITED STATES PATENT OFFICE.

ARTHUR J. HORAN, OF DETROIT, AND JAMES H. GRAY, OF HIGHLAND PARK, MICHIGAN.

METAL WHEEL-BLOCK.

1,228,438.

Specification of Letters Patent.   Patented June 5, 1917.

Application filed August 14, 1916.   Serial No. 114,749.

*To all whom it may concern:*

Be it known that we, ARTHUR J. HORAN and JAMES H. GRAY, citizens of the United States of America, residing, respectively, at Detroit and Highland Park, in the county of Wayne and State of Michigan, have invented certain new and useful Improvements in Metal Wheel-Blocks, of which the following is a specification, reference being had therein to the accompanying drawings.

This invention relates to a metallic wheel block, and the primary object of our invention is to provide a simple, durable and inexpensive wheel block that can be easily and quickly anchored relative to a floor or other surface and connected to a vehicle wheel to hold the wheel and the vehicle thereof against movement, particularly during shipment of a vehicle in a car.

A further object of our invention is to provide a one-piece metallic wheel block that can be advantageouly used on the floor of a railroad car to anchor a vehicle wheel relative thereto, the block being constructed so as not to injure the pneumatic tire or periphery of a vehicle wheel and to positively prevent lateral or vertical displacement of the wheel relative to the car floor.

The mechanical construction by which we obtain the above and other results will be hereinafter particularly pointed out in the claim, and reference will now be had to the drawing and a detail description thereof.

Figure 1 is a side elevation of a portion of an automobile wheel held by a block in accordance with our invention;

Fig. 2 is a longitudinal sectional view of a block;

Fig. 3 is a plan of the same; and

Fig. 4 is a detail view of a detached shackle or yoke.

In putting our invention into practice, we construct the block of a single piece of light and durable metal stamped and pressed to form a frusto-pyramidical shaped structure having inclined end walls 1 and 2, inclined side walls 3, a flat top wall 4, and a lateral base flange 5, said base flange forming the marginal edges of the walls 2 and 3. The base flange 5 is provided with key hole shaped openings or apertures 6 whereby the flange 5 may be placed over and under the heads of nails or studs 7 driven into a floor 8. The flange 5 has an additional opening 9 and after said flange engages under the heads of the nails 7, another nail 10 is driven into the opening 9 to positively anchor the block against vertical and lateral displacement relative to the floor 8.

The walls 2 and 3 are more abrupt or acute than the wall 1 to firmly brace said wall at an inclination and this wall has a grooved or recessed portion 11 to accommodate and conform to the periphery of the tire 12 carried by a wheel 13. The groove or recess 11 has the lower end thereof merging into the wall 1 and the upper end of the groove or recess is open at the top wall 4 of the block.

At the sides of the groove or recess 11 the wall 1 has openings 14 to accommodate a shackle or yoke 15 adapted to engage under the grooved or recessed portion 11 of the block. The shackle or yoke 15 is adapted to have the ends thereof extend upwardly at the sides of the tire 12 and the felly of the wheel, so that a clamping member 16 can be placed upon the felly of the wheel and held in engagement with the threaded ends of the shackle or yoke 15 by winged thumb nuts 17. The clamping member 16 has the inner side thereof provided with a liner 18 of leather, felt or yieldable material which will prevent the clamping member from injuring the felly of the wheel. This clamping member may be of any desired contour to conform to that of the felly of the wheel, and the shackle or yoke in its entirety constitutes means for anchoring the wheel relative to the block.

A plurality of the blocks are used when preparing a vehicle for shipment, and said blocks may be made of a non-corrodible material or the metal finished so that it will not corrode or injure the tire with which it contacts.

One embodiment of our invention has been illustrated, but it is to be understood that the structural elements are susceptible to such variations and modifications as fall within the scope of the appended claim.

What we claim is:—

A metallic wheel block made of a single piece of material providing an apertured base flange at three sides thereof and inclined walls with one of said walls formed with a recessed portion to receive a portion of a wheel, a shackle extending through the recessed wall at the sides of the recessed portion adapted to engage under the recessed portion in said block and hold a wheel relative thereto, and means adapted for holding the base flange of said block relative to a support.

In testimony whereof we affix our signatures in presence of two witnesses.

ARTHUR J. HORAN.
JAMES H. GRAY.

Witnesses:
KANE H. BUTLER,
ANNA M. DORR.